No. 672,041. Patented Apr. 16, 1901.
D. NOBLE.
TRIMMING ATTACHMENT FOR SEWING MACHINES.
(Application filed Jan. 15, 1900.)
(No Model.) 2 Sheets—Sheet 1.
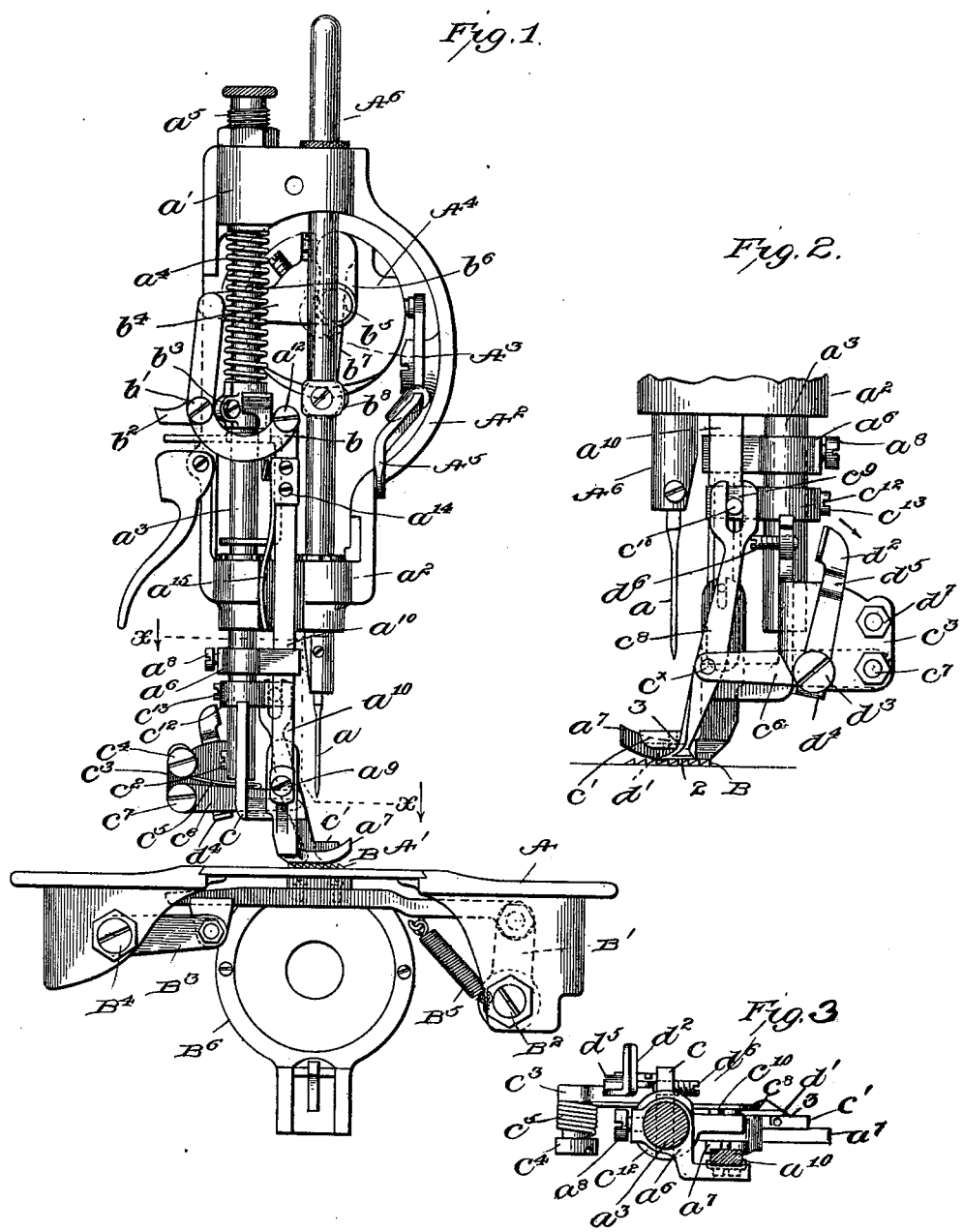
Witnesses:
J. C. Shaw,
Adolf C. Kaiser
Inventor.
Donald Noble.
by Crosby Gregory
Atty's.

No. 672,041. Patented Apr. 16, 1901.
D. NOBLE.
TRIMMING ATTACHMENT FOR SEWING MACHINES.
(Application filed Jan. 15, 1900.)
(No Model.)
2 Sheets—Sheet 2.
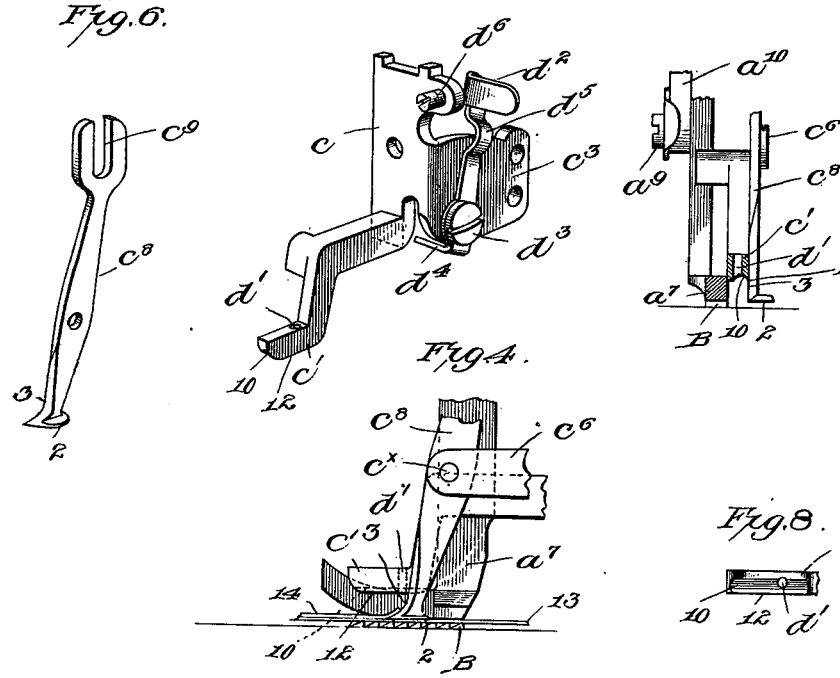
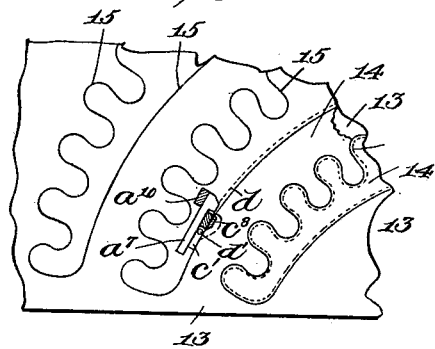
Witnesses:
J. C. Shaw.
Adolf C. Kaiser.
Inventor:
Donald Noble.
by Crosby Gregory,
atty's.

UNITED STATES PATENT OFFICE.

DONALD NOBLE, OF LONDON, ENGLAND, ASSIGNOR TO WHEELER & WILSON MANUFACTURING COMPANY, OF BRIDGEPORT, CONNECTICUT.

TRIMMING ATTACHMENT FOR SEWING-MACHINES.

SPECIFICATION forming part of Letters Patent No. 672,041, dated April 16, 1901.

Application filed January 15, 1900. Serial No. 1,431. (No model.)

*To all whom it may concern:*

Be it known that I, DONALD NOBLE, a subject of the Queen of Great Britain, residing at London, England, have invented an Improvement in Sewing-Machines, of which the following description, in connection with the accompanying drawings, is a specification, like characters on the drawings representing like parts.
This invention has for its object the improvement of that class of sewing-machines employed for trimming in pattern one ply of material while being stitched upon another ply, the work done being designated as "appliqué."

In an application Serial No. 690,550, filed by me September 9, 1898, I have shown a presser-foot provided at its under side with a blade or cutting edge constituting one member of a trimming mechanism, the other member consisting of a lever located above the fabric and operatively connected with said foot, the blade having at its upper side a cutting edge and in operation running in the space between two plies and coöperating with the cutting edge of the presser-foot to cut the upper ply in pattern, leaving a stitch upon a lower ply. The presser-foot in the application referred to rested continuously on the material and was opposed to the feeding device to form a yielding abutment with which the feeding device coöperates in feeding the material, and when the feeding device was operative the foot was lifted, causing the separation of the cutting edges, one from the other, that the material might enter between them for a limited distance, the material being cut as the foot descended in usual manner, following the descent of the feeding device. In the use of the trimming mechanism described in said application difficulty was experienced at times when trimming about sharp corners and in sharp angles because of the difficulty of turning the material sharply, due to the fact that it at the time the material must be turned to stitch and cut about a corner was held clamped by the presser-foot, and the turning of the material between the presser-foot and the feeding device was apt to pucker it, so that the trimming was not as accurate as desirable for the production of the best work. In seeking to overcome this difficulty I have discovered that the upper ply of material may be stitched and trimmed accurately, leaving the upper ply to present corners and angles of any desired shape. To enable this desirable result to be attained, I have devised and combined with a trimming mechanism of the class described a peculiar feeding mechanism, it working after the manner of the so-called "walking-foot or alternating presser," it containing two feet, one of which occupies a position directly above and moves with the feeding device, while the other occupies a position directly over the throat-plate, this latter foot, it being the innermost one, having only a vertical movement and carrying at its under side one cutting edge, the other cutting edge being carried by a lever operatively joined with said innermost presser-foot. In my improved apparatus the feeding of the material takes place while the needle occupies substantially its highest position, the feeding device engaging the material and lifting it against the main or outside traveling foot, and during the feeding operation the foot carrying the cutting edge is lifted positively to afford ample space between the edge carried by it and the edge of the coöperating lever-blade, also located above the material, and the feed-stroke having been completed and the feeding device having descended the foot having the cutting edge descends with and clamps the material between itself and the needle-plate, and during this descent the upper ply of the material is cut substantially close to the point where the last stitch was made, the needle being then in or entering the material, and the needle completes its descent through the material and gives up its thread as a loop to be entered by and made into a stitch in any usual way by any usual device coöperating with the needle and its thread to form stitches. The stitch having been completed the material must be turned preparatory to again feeding it for a new stitch, and the extent of the turning depends upon the shape or corner or angle in the pattern being displayed, and to enable the material to be turned freely to any desired extent, according to the requirements of the pattern, it is essential that the material be clamped between a stationary part of the throat-plate and the foot carrying the cutting edge, and to enable this to be done the main or outside walking-foot or presser is lifted and put in its elevated position, so that as the material is being moved to place it in proper position or direction preparatory to feeding the material the only resistance offered to the swinging or turning of the material is the friction exerted upon it by the foot carrying the cutting edge and a small smooth part of the throat surrounding the needle-hole. The material having been turned, so that the stitch and cut may be made in exactly the proper direction, the walking-foot is permitted to descend and meet the upper side of the material as the feeding device rises to engage the under side of and move the material the distance required for the new stitch.

I have also herein changed the shape of the lever-blade carrying the cutting edge, and I have so mounted it that said blade may be adjusted vertically in order that the lower enlarged foot-shaped end, made to rest on the top of the under ply during the trimming operation, may be so placed that the lower end of the blade will just touch, or nearly so, the upper side of the under ply of the material of whatever thickness when the feeding device is acting to feed the work, such adjustment obviating puckering of the goods.

The blade-cutter in the application referred to had a movement about a horizontal pivot located at a considerable distance behind and above the needle-throat, so that when the presser-foot descended to cut the material between its cutting edge and the cutting edge of the blade the presser-foot, descending in a vertical line and taking with it the pivot of the lever, caused the cutting edge of the blade, supported at its free end by an under ply of the material, to be moved forwardly, due to the change of position of said fulcrum, such movement putting a forward strain upon the material being cut, such forward movement forcing, as it were, out of the space between said cutting edges the upper ply of material to be trimmed, stitch after stitch, and so also this forward movement of the cutting-blades in contact with an under ply exerted a tendency to pucker and distort the under ply, this being aggravated by the pressure of the flattened under front edge of the blade upon the under ply, the distortion being greater with the increasing thickness or softness of material. To overcome this tendency, I have mounted the cutting-blade herein to be described substantially close to the line of operation of the needle in stitching, so that the said blade when the cutting operation is effected stands stationary—that is, it has no horizontal movement—and the presser-foot coöperating with it descends in a vertical line, and consequently the cut made in the material is a direct cut, without any tendency to draw the upper ply of material, and inasmuch as the broadened lower end of the blade remains in one position without movement on the under ply during the cutting operation that ply is prevented from having any movement whatever that would tend to pucker the material.

Figure 1 represents a front elevation of a sewing-machine with the face-plate removed from the arm carrying the needle-bar-actuating mechanism, the removal of the face-plate representing the needle-bar, the walking-foot or alternating presser, and my improved cutting mechanism in operative position. Fig. 2 is a rear side elevation chiefly to show the cutting mechanism represented in Fig. 1. Fig. 3 is a section below the dotted line $x$. Fig. 4 is an enlarged detail of the cutting mechanism detached from the machine. Fig. 5 is an enlarged detail of the foot, from the under side of which projects one of the cutting edges, detached, together with the controller. Fig. 6 is a perspective detail of the lever-blade detached. Fig. 7 is a section of Fig. 4 in the dotted line $x'$. Fig. 8 is an under side view of the foot $c'$, showing its groove and cutting edge. Fig. 9 is a detail showing the work to be done on the machine.

Referring to the drawings, the bed-plate or work-support A, the needle-throat A' therein, the overhanging arm $A^2$, it containing a shaft $A^3$, represented by dotted lines, said shaft having at its front end a hub $A^4$, provided in its periphery with a suitable cam (not shown) adapted to operate the take-up $A^5$, the needle-bar $A^6$, having an eye-pointed needle $a$, the feeding device B, having imparted to it forward and backward movements by a suitable arm B', carried by a rock-shaft centered by a stud $B^2$ and having imparted to it at proper times a rising movement by an arm $B^3$, also centered by a stud $B^4$, said feeding device being retracted by a suitable spring $B^5$, and the raceway $B^6$ are and may be all of usual construction, said raceway containing, it will be supposed, a suitable loop-taker or shuttle to coöperate with the needle in the formation of a stitch. It will be understood, however, that my improvements may be added without invention to any usual sewing-machine, it being immaterial what is the character of the complemental stitch-forming device coöperating with the eye-pointed needle.

The end of the overhanging arm $A^2$ (see Fig. 1) has suitable bearings, as $a'$ and $a^2$, in which is fitted a presser-bar $a^3$, it being surrounded by a spring, as $a^4$, of usual construction, the strength of which may be adjusted by rotating the usual hollow nut $a^5$. The bar $a^3$, below the bearing $a^2$, is provided with a guide $a^6$ for the walking-foot $a^7$ of the so-called "alternating" presser, said guide being held in adjusted position by means of a suitable set-screw $a^8$. The walking-foot $a^7$ is connected adjustably by an adjusting-screw $a^9$ with the lower end of a bar $a^{10}$, the upper end of said bar receiving through a hole therein a stud-screw $a^{12}$, carried by one end of a rocker-lever $b$, pivoted at $b'$ on a bracket $b^2$, suitably fixed by a clamping-screw $b^3$ on the presser-bar $a^3$, the hub of said bracket $b^2$ sustaining the lower end of the spring $a^4$. The upper end of the lever $b$ is herein represented as having connected with it a link $b^4$, the inner end of which surrounds a suitable stud, as $b^5$, carried by a crank $b^6$, offset from the usual crank-pin carried by the disk $A^4$, the latter crank-pin being embraced by a link $b^7$, which engages a stud on a collar $b^8$, fixed to the needle-bar, so that the rotation of the shaft carrying the disk $A^4$ not only reciprocates the needle-bar in usual manner, but also moves the lever $b$ and effects the raising and lowering of the walking-foot, the crank-pin in its movement so acting upon the lever $b$ as to maintain the walking-foot in its elevated or inoperative position while the cutting mechanism, to be described, is acting to cut the material and the needle is acting to form the stitch.

The bar $a^{10}$ has connected with it by screws $a^{14}$ a suitable spring $a^{15}$, the free end of the spring acting against a suitable shoulder, herein represented as formed in the bearing $a^2$. The spring $a^{15}$ acts normally to throw the walking-foot into its forward position whenever the feed device acts to feed the material the distance required for the new stitch, so that when the foot is lifted preparatory to cutting the spring acts quickly to return the foot into its normal position. In this way it will be understood that the walking-foot moves coincidentally with the feeding device when the latter acts to feed the material. In order to constitute an alternating presser, of which this walking-foot forms a coöperating member, it is necessary to employ a second presser-foot, which I will now describe.

The lower end of the bar $a^3$ is or may be slitted in usual manner to receive, as herein represented, a shank-piece $c$ forming part of a foot $c'$, said foot being sustained in position on said bar by a suitable screw $c^2$, and, as herein represented, the shank $c$ has a backwardly-extended lip $c^3$, provided with a stud-screw $c^4$, surrounded by a suitable spring $c^5$, one end of which is connected with a hole or slot in said screw, the free end of said spring (see Fig. 1) being extended forwardly and bearing upon a lever $c^6$, pivoted at $c^7$. The foot $c'$ constitutes one member of the cutting device or mechanism, and in order that it may so act the under side of said foot, which may be made of steel, is grooved at 10, leaving a thin cutting edge 12 at one side of said groove, said cutting edge being located at the inner or right-hand side of said foot, viewing Fig. 7, the cutting edge projecting downwardly from the under side of the foot.

I find that the cutting edge may with good results be made integral with the foot $c'$; but, if desired, I may provide the foot $c'$ with a detachable blade, as provided for in my said application.

The forward end of the lever $c^6$ carries a suitable pivot or fulcrum $c^x$, (see Fig. 2,) upon which is mounted the lever-blade $c^8$, said blade at its upper end having, as herein represented, a suitable slot $c^9$, which has a sliding fit with a stud $c^{10}$, carried by a collar $c^{12}$, secured to said presser-bar by a suitable screw $c^{13}$, said stud and slot forming a sliding connection between the presser and blade. The slotted end of the lever and stud permit the stud to rise in the slot as the foot, to be described, is lifted positively during the time that the material is being fed, said foot $c'$ being put into its operative position preparatory to its descent to cut the material.

The lower end of the lever $c^8$ is of peculiar shape (see detail Fig. 6)—that is, it has a small foot flattened at its under side, as at 2, to bear upon an under ply of material, the front end of the foot portion being tapered to enable it to also run under an upper ply of material and between said ply and an under ply close to a point where the two plies of material are being stitched together, the lever at the upper side of said foot being sharpened, as at 3, to present a cutting edge. The other cutting edge coöperating with the cutting edge of the lever to cut the upper ply of material close to the stitch-forming point is represented at $d'$, (see Fig. 9,) said cutting edge being carried by and extending downwardly from the under side of the foot $c'$, said cutting edge occupying a position at the inner edge of said foot, a suitable groove being cut longitudinally in the under side of said foot at, as herein represented, the right-hand side of said cutting edge when the foot is in operative position, the operator sitting in front of the machine.

The foot $c'$ has a needle-hole $d'$, through which the needle acts in its passage through the material to be stitched.

The lever $c^6$, carrying the stud or fulcrum for the lever $c^8$, provided with the cutting edge, is pivoted at $c^7$, so that said lever may be adjusted, when desired, to elevate the stud or fulcrum of the lever $c^8$, and thereby put the lower end 2 of said lever in any desired position, that depending upon the thickness of the material of the under ply, for it will be understood that it is very desirable that the material when being fed by the usual feeding device coöperating with the walking-foot should be freed substantially from all friction which would tend to retard its movement or distort the material and turn it out of the proper true feeding-line or pucker the same. Therefore to adjust this lever I have provided, as herein represented, a controller $d^2$, shown as a lever pivoted at $d^3$, the lower end of said lever being extended underneath the lever $c^6$, as at $d^4$, (see Fig. 1,) so that by turning this lever, which may be suitably bent, as at $d^5$, to thereby make of it a spring to coöperate with the surface of the extension $c^3$ the lever may be maintained in its adjusted position.

I may readily move the lever $c^6$ to put the lever $c^8$ in any desired position according to the thickness of the material; but as the operator starts to make appliqué work on a foundation or under ply of a given thickness a stop-screw $d^6$ may and preferably will be adjusted in such position that the upper or longer end of the lever $d^2$ may abut against it, and thereby determine the lowest position for the lower end of the lever $c^3$, and said stop-screw may be left in such position until an under ply of different thickness is to be operated upon. It sometimes, however, happens in the operation of the machine that the operator desires to throw out of action altogether the cutting mechanism, and at such time it is desirable that the under side 2 of the lever $c^8$ stand substantially flush with the under side of the foot $c'$, and in such event the operator will turn the lever $d^2$, (see Fig. 2,) putting the said lever against the nut $d^7$, holding the stud-screw $c^4$ in place, said nut operating as a stop. The provision herein made for quickly putting the cutting member $c^8$ into its inoperative position, as described, is an important feature of this invention for the reason that when cutting and trimming a very narrow V-shaped corner the stitching must pass beyond the apex of the corner, and this could not be if the cutting continued for each stitch, so when completing the stitching in such a corner the operator may turn the lever $d^2$ and put the cutter out of action, so that several stitches may be made without cutting, and when the stitching has been carried along on the opposite side of the V for a suitable distance to commence trimming the lever may be turned to meet the stop-screw, so that the blade may be readily again put into its cutting position.

In the operation of the machine, referring to Fig. 1, the parts are therein represented in the positions they assume when the needle is in its most elevated position and the feeding device has been raised through the slot of the throat-plate to contact with the under side of the material, and in this position it will be seen that the foot $c'$ is lifted by or through the pressure of the upper side of the material on the under side of the walking-foot, the upper end of the bar $a^{10}$ during such action pressing upwardly the stud $a^{12}$ and lifting the bar $a^3$ to compress the spring $a^4$, the lever $b$ being prevented from turning at such time by the position of the link $b^4$, connected with its upper end. Now as the disk $A^4$ is turning in the direction of the arrow and the needle-bar descends the feeding device is started forwardly and impinges the work between itself and the under side of the walking-foot, the material and the walking-foot are moved to the left, viewing Fig. 1, and the movement of the foot is arrested just before the needle enters the hole in the foot $c'$ on its way into the material. During this feeding movement of the material it will be understood that the foot $c'$ was lifted to open the space between the cutting edge of said foot and the cutting edge 3 of the lever $c^8$, the latter lever occupying a position with its lower end 2 in contact with the under ply 13 of material, and that the upper ply 14 of material is fed into the space left between the cutting edges 12 and 3 (see Fig. 4) preparatory to making the next stitch, and when the foot $c'$ again descends the upper ply of material will be cut for a stitch length.

Referring now again to the cycle of operation of the machine where the feeding stroke was arrested and the needle was approaching the material, it will be understood that the extension $b^6$ of the crank-pin in the movement of the disk $A^4$ has been so turned as not to impart any movement to the lever $b$; but as the needle in its descent meets and starts to enter the cloth the crank-pin or other part connected with the link for operating the needle-bar passes the horizontal center of the shaft carrying the disk $A^4$, and such movement of the crank-pin causes the extension to move to the left in the direction of the feed, letting the spring $a^4$ act to depress the bar $a^3$ and with it the foot $c'$, the descent of the foot in a vertical line acting, as stated, to cut the material between its cutting edge and the cutting edge of the lever $c^8$ by a direct straight cut, the completion of the descent of the foot $c'$ putting it in position to clamp the work already trimmed firmly between itself and the upper side of the throat-plate about the needle-hole. The foot $c'$ in its lowest or clamping position causes the portion 2 of the lever $c^8$ to press downwardly upon the under-ply material. As the foot $c'$ comes into clamping position, as stated, after having completed the trimming cut, the crank-pin of the shaft carrying the disk $A^4$ for operating the needle-bar comes in its further rotation substantially in vertical position below said shaft, and during this last quarter-turn of the shaft the spring $a^4$ has acted fully and has effected the clamping of the foot $c'$ upon the stock, and just at the completion of this quarter-turn the loop of needle-thread having been engaged by the under coöperating complemental stitch-forming device the extension $b^6$ in its movement pushes the upper end of the lever $b$ to the right, viewing Fig. 1, causing its inner or shorter arm to rise and elevate the walking-foot from the material, said walking-foot as it leaves the material being moved by the spring $a^{15}$ to the right as the feeding device (it having completed its stroke) is about to retire from the under side of the material, thus putting the lifting-foot in position to be engaged by the rising feeding device when next to be started to effect the next feeding movement. The feeding device does not, however, start on its backward stroke until after the walking-foot has been restored by its spring into its normal or starting position. The upward movement of the walking-foot by or through the action of the lever $b$ while the foot $c'$ rests upon the upper side of the material takes place after the walking-foot has been moved forwardly by its spring $a^{15}$, and during the time that the walking-foot is so held elevated the feeding device completes its back stroke, and the needle rises during this back stroke of the feeding device, and just before the feeding device reaches its extreme back stroke the walking-foot is permitted to descend, the crank-pin actuating the needle-bar being at such time substantially opposite the right-hand horizontal center of the shaft carrying the disk $A^4$, and as said crank-pin rides up and sweeps over the upper center of the said shaft, the needle then having reached its highest point and the walking-foot yet resting upon the material sustained by the lowered feeding device, the lever $b$ is acted upon by the link $b^4$ in a direction to turn it about its stud $b$; but inasmuch as the lifting-foot is arrested by the material said lever is subjected to such strain that the spring $a^4$ is compressed by the rising of the fulcrum of the lever $b$, said lever at such time acting at its inner end upon the stud $a^{12}$ in the upper end of the bar $a^{10}$, the foot $c$ being lifted from the material at a point when the needle is in about its highest position, and at this time while the needle remains substantially or nearly stationary the take-up is operated to draw up the excess of loop in the stitch already formed, and during the taking up of this loop the needle slightly descends and the feeding device rises, lifting the material, and with it the walking-foot, carrying the walking-foot backwardly in the direction of the feed until, as before stated, the needle comes into a position to enter the material, when the feeding device retires, letting the walking-foot move forwardly into its normal position as the foot $c'$ descends to effect another cutting action and clamp the work.

The foregoing represents one substantial cycle of operation of the machine, and this will be repeated in suitable manner.

Having described one operative form of walking-foot, it will be understood that this invention is not limited to the precise devices herein employed for actuating the walking-foot, as instead I may employ any other usual or suitable walking-foot or alternating-presser mechanism, the object being, as hereinbefore stated, to leave the material at and about the needle free from pressure when being turned to meet the requirements of a sharp angle, except at and about the needle or between the under side of the small cutting-foot $c'$ and the throat-plate, the walking-foot at such time being elevated, so that the material at a distance from the stitching-point is not subjected to any friction, as between a presser-foot and a feeding device or throat-plate, as when the presser-foot is simply a clamping device coöperating with the feeding device.

I have represented in Fig. 9 a diagrammatical figure to indicate the class of work to be done on the machine herein described, and in said figure, 13 represents an under ply, 14 an upper ply, and 15 indicates markings in pattern, said markings representing lines on which the upper ply is to be stitched to the under ply, as by stitches 16, the upper ply being trimmed coincidentally with said line of stitching to leave an edge 17 on the upper ply in pattern displayed upon the under ply, it being understood that after the stitching and trimming have taken place stitch after stitch the material of the upper ply which it is not intended to retain will be removed, leaving the upper ply stitched in pattern upon the under ply.

The detailed view, Fig. 4, represents the feed as engaging the under ply 13 of material and with the flattened lower end of the blade $c^8$ resting substantially in contact with the upper side of the under ply, the upper ply having been projected by the action of the feeding device and the walking-foot $a^7$ into the space between the under side of the foot $c'$ and the cutting edge 3 extended upwardly from the blade $c^8$, said upper ply being cut at the next descent of the foot $c'$. In this figure the upper ply is broken off, for the reason that it could not be properly represented in that figure in the way that it would appear in practical work.

Having described my invention, what I claim as new, and desire to secure by Letters Patent, is—

1. A trimming device for trimming to pattern an upper ply of material stitched to an under ply, comprising a presser-foot having at its under side a cutting edge, a member contacting at its lower end with the under ply of material and provided with a toe adapted to pass beneath the upper ply and having at its upper side a coöperating cutting edge, means to bodily adjust said member vertically and independently of the presser-foot to thereby adapt the position of the lower end of the member interposed between the two plies to varying thicknesses of material in the under ply, and means for operating the said presser-foot and coöperating member to trim the upper ply.

2. In a trimming mechanism for trimming an upper ply stitched to an under ply, a foot having a cutting edge at its lower side and acting on the upper ply of material to be trimmed, a pivoted blade having a toe provided with a cutting edge at its upper side and interposed between the upper and under ply, and a guide for said blade to restrain it from vibration about its pivot during the descent of the foot having the cutting edge and while the under ply is being cut and means for operating the said foot and blade to trim the upper ply.

3. In a trimming mechanism for trimming an upper ply stitched to an under ply, means for feeding the fabric in a right line, trimming means held to operate in a fixed vertical plane, comprising a presser-foot to press upon the material to be cut and provided at its under side with a cutting edge, a coöperating blade having at its upper side a cutting edge combined with means located above said presser-foot to lift it vertically with relation to said blade, and means to thereafter insure the descent of said foot in a substantially vertical line causing the material lying between said cutting edges to be cut.

4. In a trimming device for trimming one ply lying on another ply, a blade having a toe extended from near its lower end and sharpened at its upper side and adapted to run in the space between two plies, a pivot for said blade, and means to adjust said pivot vertically to prevent friction of the blade on the under ply to pucker the same, a member having a cutting edge for coöperating with said blade, and means for operating said member and blade to trim the upper ply.

5. A foot, a lever pivotally sustained by said foot, a lever-like cutting-blade having its fulcrum on said lever, and means to adjust said lever to insure any desired position for the fulcrum of the cutting-blade, and of the lower end of said cutting-blade with relation to the lower side of said foot.

6. In a sewing-machine for stitching and trimming in the production of appliqué work, stitch-forming mechanism, a feeding device to engage the under side of the material, a divided or two-part presser-foot, means to raise and lower each of said parts independently of the feeding device, one of said parts having at its under side a cutting edge, and a lever-blade having its end shaped to rest upon an under ply and enter between said under and upper ply and provided above its said end with a cutting edge coöperating with the edge carried by the under side of one part of said two-part foot.

7. A work-support, stitch-forming mechanism, a feeding device, and an alternating presser composed of two feet, one of which has a cutting edge and a coöperating cutter-lever located above the material and having a cutting edge, and means operating automatically to lift said pressers alternately from the material, one of said pressers having also imparted to it a horizontal movement with the feeding device.

8. In a trimming device, a blade-like cutter having a fulcrum, an upward extension above its fulcrum and at its lower end a face 2 to contact with an under ply of material to which an upper ply is being stitched, said blade having at its upper side a cutting edge, the blade entering a space between the under and upper ply of material, combined with a presser-foot having at its under side a cutting edge, means to move said presser-foot vertically while the lower end of the blade is substantially free from contact with the under ply of material, said foot thereafter descending in a vertical line, taking with it for a short distance the cutting-blade that the latter may come in contact firmly with the under ply of material, the blade being thereafter held stationary while the presser-foot carrying the cutter-blade descends in a vertical line whereby the cut made through the upper ply of material is a straight direct cut without tendency to crowd or pucker the upper ply of material.

9. A trimming device for cutting in pattern an upper ply of material lying on an under ply, said device consisting of a presser-foot having at its under side a cutting edge, and a coöperating pivoted blade having at its upper side a cutting edge, means engaging said blade above its fulcrum to control its position, and means to adjust said blade that it may occupy a position with relation to the presser-foot containing the cutting edge to adapt it to varying thicknesses of material in the under ply.

10. In a trimming mechanism for trimming an upper ply of material stitched to an under ply, a foot having a cutting edge at its lower side and acting on the upper ply of material to be trimmed, a lever, a blade having a toe provided with a cutting edge at its upper side and pivotally mounted upon said lever, said toe being interposed between the upper and under ply of material, a guide for said blade to restrain it from vibration about its pivot during the cutting operation and means to adjust said lever and retain it in its adjusted position according to the thickness of the under ply of material which is not to be trimmed, and means for operating said foot and blade to trim the upper ply.

11. A trimming device consisting of a presser-foot provided at its under side with a cutting edge and a coöperating lever-blade having at its upper side a cutting edge; combined with means to positively lift said foot to provide space between the cutting edge of the foot and of the blade for the entrance of material to be cut, and means to restrain forward movement of said blade during the cutting of the material as the presser-foot descends.

12. In a sewing-machine for stitching and trimming in the production of appliqué work, a divided or two-part presser-foot, means independent of the feeding device to move each of said parts vertically, one of said parts having at its under side a cutting edge, and a lever-blade having its end terminating at the under ply of the material and entering between said under and upper ply, said blade being provided above its said end with a cutting edge coöperating with the edge carried by the under side of one part of said two-part foot.

13. In a trimming device for sewing-machines, a presser-foot to press upon the material to be cut, an auxiliary presser-foot having at its under side a cutting edge, and a co-acting blade located and adapted to stand between the upper and under plies of material, means to adjust said blade vertically that it may occupy varying positions according to the thickness of the under ply of the material, and means to lift the auxiliary presser-foot having the cutting edge independently of the blade to enable the upper ply of material to enter between said upper edge and cutting-blade preparatory to being cut by a descent of the auxiliary foot.

14. In a machine for stitching together layers of material and trimming the upper ply in pattern, the combination with stitch-forming mechanism, of a trimming device consisting of a substantially vertical lever the lower end of which contacts with the under ply of material, said lever having a sharpened upwardly-arranged cutting edge to sustain only an upper ply, and a presser-foot having at its under side a cutting edge, means to move said foot and its edge vertically independently of said blade to separate said edges for the entrance between them of the upper ply to be cut, and a pivot for said blade, said pivot occupying a position between the shank of the presser-foot and the path of movement of the needle-bar, said foot being restrained from horizontal movement during the cutting operation.

In testimony whereof I have signed my name to this specification in the presence of two subscribing witnesses.

DONALD NOBLE.

Witnesses:
   GEO. W. GREGORY,
   MARGARET A. DUNN.